US012807801B2

(12) United States Patent
Liao et al.

(10) Patent No.: US 12,807,801 B2
(45) Date of Patent: Nov. 24, 2026

(54) POLYVINYL CHLORIDE SYNTHETIC LEATHER WITHOUT FOAMING STRUCTURE AND METHOD FOR PRODUCING THE SAME

(71) Applicant: NAN YA PLASTICS CORPORATION, Taipei (TW)

(72) Inventors: Te-Chao Liao, Taipei (TW); Wei-Sheng Cheng, Taipei (TW); Chao-Tung Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 118 days.

(21) Appl. No.: 18/388,263

(22) Filed: Nov. 9, 2023

(65) Prior Publication Data

US 2025/0084243 A1 Mar. 13, 2025

(30) Foreign Application Priority Data

Sep. 12, 2023 (TW) ................................. 112134565

(51) Int. Cl.
*C08L 27/06* (2006.01)
*B32B 5/02* (2006.01)
(Continued)

(52) U.S. Cl.
CPC .............. *C08L 27/06* (2013.01); *B32B 5/022* (2013.01); *B32B 5/024* (2013.01); *B32B 5/26* (2013.01);
(Continued)

(58) Field of Classification Search
CPC ......... C08L 27/06; B32B 5/022; B32B 5/024; B32B 5/26; B32B 37/156
(Continued)

(56) References Cited

U.S. PATENT DOCUMENTS

| | | | | | |
|---|---|---|---|---|---|
| 3,850,725 | A * | 11/1974 | Spielau | B32B 9/025 | 156/332 |
| 2009/0054574 | A1* | 2/2009 | Holt | C08K 5/0016 | 524/321 |
| 2018/0127390 | A1* | 5/2018 | Inoue | C08K 5/1515 | |
| 2023/0073584 | A1* | 3/2023 | Yamasaki | C08G 63/672 | |
| 2023/0106419 | A1* | 4/2023 | Liao | D06N 3/08 | 428/151 |
| 2025/0129206 | A1* | 4/2025 | Fukumoto | C08G 63/60 | |

FOREIGN PATENT DOCUMENTS

| | | |
|---|---|---|
| CN | 107163233 A | 9/2017 |
| CN | 107190521 A | 9/2017 |

(Continued)

*Primary Examiner* — Tahseen Khan
(74) *Attorney, Agent, or Firm* — Li & Cai Intellectual Property (USA) Office

(57) ABSTRACT

A polyvinyl chloride synthetic leather without a foaming structure and a method for producing the same are provided. The polyvinyl chloride synthetic leather includes a base fabric layer and a top fabric layer. The top fabric layer is formed of a fabric composition that includes a polyvinyl chloride resin and a polymer plasticizer. The polymer plasticizer is formed from a dibasic acid raw material and a diol raw material through a polycondensation reaction, and is end-capped by an end-capped fatty acid. A chemical structure of the end-capped fatty acid has a long carbon chain (C8 to C22). An end of the long carbon chain has a carboxyl group, and another end thereof does not have any carboxyl group. A residual amount of the diol raw material in the polymer plasticizer is less than 300 ppm. An acid value of the polymer plasticizer is less than 1 mg KOH/g.

7 Claims, 1 Drawing Sheet

(51) Int. Cl.
*B32B 5/26* (2006.01)
*B32B 37/00* (2006.01)

(52) U.S. Cl.
CPC ........ *B32B 37/156* (2013.01); *B32B 2250/02* (2013.01); *B32B 2250/20* (2013.01); *B32B 2255/02* (2013.01); *B32B 2262/0238* (2013.01); *B32B 2264/102* (2013.01); *B32B 2264/104* (2013.01); *B32B 2305/18* (2013.01); *B32B 2307/3065* (2013.01); *B32B 2327/06* (2013.01)

(58) Field of Classification Search
USPC .......................................................... 428/221
See application file for complete search history.

(56) References Cited

FOREIGN PATENT DOCUMENTS

| | | | | |
|---|---|---|---|---|
| CN | 107366166 | A | 11/2017 | |
| JP | 202213701 | A | 1/2022 | |
| JP | 202356760 | A | 4/2023 | |
| TW | 202311598 | A | 3/2023 | |
| WO | WO 2015106095 | A1 | 7/2015 | |
| WO | WO2021176901 | A1 | 9/2021 | |
| WO | WO-2023032862 | A1 * | 3/2023 | .............. C08L 27/06 |
| WO | WO 2023127223 | A1 | 7/2023 | |

* cited by examiner

POLYVINYL CHLORIDE SYNTHETIC LEATHER WITHOUT FOAMING STRUCTURE AND METHOD FOR PRODUCING THE SAME

CROSS-REFERENCE TO RELATED PATENT APPLICATION

This application claims the benefit of priority to Taiwan Patent Application No. 112134565, filed on Sep. 12, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyvinyl chloride synthetic leather, and more particularly to a polyvinyl chloride synthetic leather without a foaming structure.

BACKGROUND OF THE DISCLOSURE

Polyvinyl chloride (i.e., PVC) is a main material for producing and developing a synthetic leather, and is widely applied in automotive interiors. The polyvinyl chloride that has a high degree of aggregation has a high melting temperature, and the melted polyvinyl chloride has poor fluidity, thereby causing processing difficulty.

The polyvinyl chloride is added with a plasticizer for improving the fluidity of the melted polyvinyl chloride, so as to reduce a processing temperature and facilitate processing and production. However, a phenolic acid plasticizer used in a conventional technique has a pungent odor, and other additives (e.g., a foaming agent) added during a processing process of the polyvinyl chloride may also have a pungent odor.

In addition, a surface of the synthetic leather is usually treated to improve a surface property of the synthetic leather, and a conventional surface treatment is mainly carried out by use of a solvent surface treatment agent.

However, the disadvantage of the solvent surface treatment agent is its relatively high odor level. According to the Volkswagen odor test standard PV3900C3, an odor level of a conventional surface-treated synthetic leather is greater than or equal to 4.0, which can seriously affect pleasantness of a user during use. The conventional solvent surface treatment agent may also include harsh solvents (e.g., toluene and xylene) that are harmful to human health.

Furthermore, a conventional polyvinyl chloride synthetic leather usually includes a compact top fabric layer and a foaming layer that provides a leather feeling. However, the conventional foaming layer includes a foaming structure generated by using a foaming agent, and may still emit a pungent odor. For example, as shown in FIG. 1, a polyvinyl chloride synthetic leather 100a of the related art sequentially (from bottom to top) includes a base fabric layer 1a, a foaming layer 2a, a top fabric layer 3a, and a surface treatment layer 4a that is optionally coated. For a conventional foaming layer, a foaming structure is generally generated through the foaming agent to provide the leather feeling.

In recent years, much research has been dedicated to improving the odor level of the polyvinyl chloride synthetic leather.

China Publication No. CN107190521A discloses a polyvinyl chloride synthetic leather having a slight odor. The synthetic leather sequentially includes a base fabric layer, a PVC leather layer, and a paint layer. The plasticizer used in this patent includes epoxidized soybean oil and phenolic plasticizers. In order to provide a leather feeling, the foaming agent is still used to generate the foaming structure.

China Publication No. CN107366166A discloses a polyvinyl chloride synthetic leather that has no reproductive toxicity, which includes a polyvinyl chloride surface layer, a polyvinyl chloride foaming layer, and an aqueous paint layer coated on the polyvinyl chloride surface layer. The aqueous paint layer does not include N-methylpyrrolidone and N-ethylpyrrolidone, thereby satisfying environmental requirements of low VOC (volatile organic compounds) and low odor at the same time. However, in order to provide a leather feeling, the foaming agent is still used to generate the foaming structure.

In the above-mentioned polyvinyl chloride synthetic leather, since the foaming agent (especially a chemical foaming agent) is used to generate the foaming structure, such polyvinyl chloride synthetic leather may still emit a pungent odor.

In the technical field of the polyvinyl chloride synthetic leather, there is still room for improvement in the related art for reducing the odor level of the polyvinyl chloride synthetic leather, so as to improve an interior environment of a vehicle and satisfy requirements of most mid- and high-class automobiles.

Furthermore, enhancing the use of non-petrochemical sourced materials in the polyvinyl chloride synthetic leather is also an objective to be achieved in this industry.

SUMMARY OF THE DISCLOSURE

In response to the above-referenced technical inadequacies, the present disclosure provides a polyvinyl chloride synthetic leather without a foaming structure and a method for producing the same.

In order to solve the above-mentioned problems, one of the technical aspects adopted by the present disclosure is to provide a polyvinyl chloride synthetic leather without a foaming structure. The polyvinyl chloride synthetic leather includes a base fabric layer and a top fabric layer. The top fabric layer is formed on the base fabric layer. The top fabric layer is formed of a fabric composition. Based on a total weight of the fabric composition being 100 parts by weight, the fabric composition contains: 25 parts by weight to 65 parts by weight of a polyvinyl chloride resin and 20 parts by weight to 60 parts by weight of a polymer plasticizer.

The polymer plasticizer is formed by a polycondensation reaction of a dibasic acid raw material and a diol raw material, and is end-capped by an end-capped fatty acid. The end-capped fatty acid is a biomass derived fatty acid, a chemical structure of the end-capped fatty acid has a long carbon chain having a carbon number ranging from C8 to C22, an end of the long carbon chain has a carboxyl group, and another end of the long carbon chain does not have any carboxyl group.

A residual amount of the diol raw material in the polymer plasticizer is less than 300 parts per million (ppm), and an acid value of the polymer plasticizer is less than 1 mg KOH/g.

In one of the possible or preferred embodiments, the end-capped fatty acid is selected from the group consisting of lauric acid, stearic acid, palmitic acid, linoleic acid, n-caprylic acid, capric acid, and myristic acid.

In one of the possible or preferred embodiments, in the polycondensation reaction, a first initial molar amount of the dibasic acid raw material is less than a second initial molar amount of the diol raw material.

In one of the possible or preferred embodiments, the fabric composition further includes 3 parts by weight to 5 parts by weight of a stabilizer. The stabilizer is selected from the group consisting of lithium stearate, magnesium stearate, calcium stearate, barium stearate, zinc stearate, magnesium laurate, barium laurate, zinc laurate, calcium ricinoleate, barium ricinoleate, zinc ricinoleate, and zinc caprylate.

In one of the possible or preferred embodiments, there is no foaming layer disposed between the top fabric layer and the base fabric layer, and the top fabric layer does not have any foaming pores.

In order to solve the above-mentioned problems, another one of the technical aspects adopted by the present disclosure is to provide a method for producing a polyvinyl chloride synthetic leather without a foaming structure, which includes steps of: providing a base fabric layer; and forming a top fabric layer on a side surface of the base fabric layer. The top fabric layer is formed of a fabric composition. Based on a total weight of the fabric composition being 100 parts by weight, the fabric composition contains: 25 parts by weight to 65 parts by weight of a polyvinyl chloride resin and 20 parts by weight to 60 parts by weight of a polymer plasticizer. The polymer plasticizer is formed by a polycondensation reaction of a dibasic acid raw material and a diol raw material, and is end-capped by an end-capped fatty acid. The end-capped fatty acid is a biomass derived fatty acid, a chemical structure of the end-capped fatty acid has a long carbon chain having a carbon number ranging from C8 to C22, an end of the long carbon chain has a carboxyl group, and another end of the long carbon chain does not have any carboxyl group. A residual amount of the diol raw material in the polymer plasticizer is less than 300 parts per million (ppm), and an acid value of the polymer plasticizer is less than 1 mg KOH/g.

In one of the possible or preferred embodiments, the polymer plasticizer is formed by performing an esterification process and an end-capping process. The esterification process includes: mixing the dibasic acid raw material with the diol raw material to form a reaction mixture, and heating the reaction mixture to carry out the polycondensation reaction, so as to form a high molecular weight polyester polyol. Ends of the chemical structure of the high molecular weight polyester polyol have excess amounts of hydroxyl groups (—OH). The end-capping process includes: adding the biomass derived fatty acid into the reaction mixture to end-cap the excess amounts of hydroxyl groups on the high molecular weight polyester polyol, thereby terminating the polycondensation reaction and then forming the polymer plasticizer.

In one of the possible or preferred embodiments, during the esterification step, a first initial molar amount of the dibasic acid raw material added in the reaction mixture is less than a second initial molar amount of the diol raw material added in the reaction mixture.

In one of the possible or preferred embodiments, during the end-capping step, a third initial molar amount of the end-capped fatty acid added in the reaction mixture is greater than a difference value obtained by subtracting the first initial molar amount of the dibasic acid raw material from the second initial molar amount of the diol raw material, and the third initial molar amount is 1.5 to 3 times the difference value.

In one of the possible or preferred embodiments, a molar ratio among the first initial molar amount of the dibasic acid raw material, the second initial molar amount of the diol raw material, and the third initial molar amount of the end-capped fatty acid is 0.27 to 0.31:0.32 to 0.35:0.06 to 0.09.

Therefore, in the polyvinyl chloride synthetic leather and the method for producing the same provided by the present disclosure, by virtue of the molecular weight and the molecular structure of the polymer plasticizer, the polymer plasticizer can substitute for conventional low-molecular-weight plasticizers, and the use of foaming agents can be avoided. As a result, not only is an odor rating of the polyvinyl chloride synthetic leather improved, but the molecular structure of the polymer plasticizer also enables the top fabric layer of the polyvinyl chloride synthetic leather to have a leather-like touch and feel.

Furthermore, as the chemical structure of the polymer plasticizer used in the present disclosure ends with a biomass-derived end-capped fatty acid, the biomass content in the polyvinyl chloride synthetic leather is increased. The biomass-derived end-capped fatty acid possesses a natural fragrance (e.g., a natural soap scent), which aids in improving the odor emitted from the polyvinyl chloride synthetic leather. Moreover, in terms of reducing a diol residue in the reaction mixture, the technical solution provided by the present disclosure is more effective in the reduction of the diol residue as compared to removing diol merely through a conventional vacuum distillation technique.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
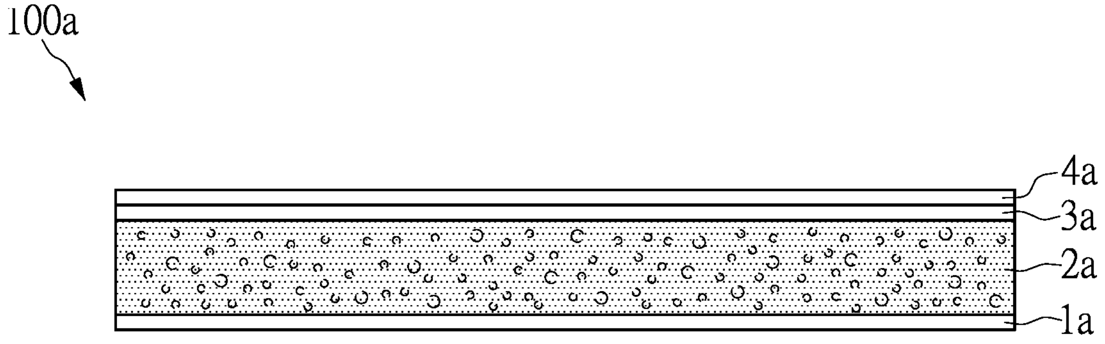
FIG. 1(Related Art)
FIG. 1 is a schematic view of a laminated structure of a conventional polyvinyl chloride synthetic leather in the related art.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

[Polyvinyl Chloride Synthetic Leather]

Figure 2:
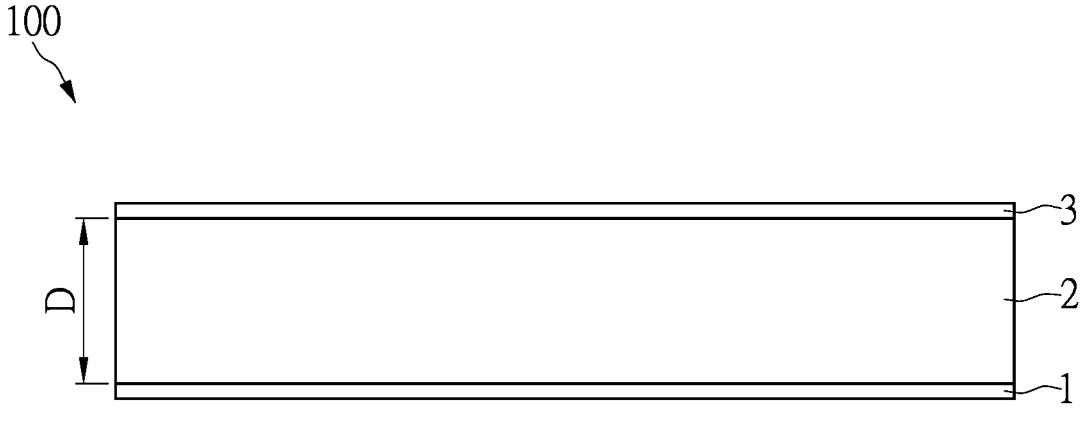
FIG. 2 is a schematic view of a laminated structure of a polyvinyl chloride synthetic leather according to an embodiment of the present disclosure.

As shown in FIG. 2, an embodiment of the present disclosure provides a polyvinyl chloride synthetic leather 100, especially a polyvinyl chloride synthetic leather 100 without a foaming structure. In addition, a composition of the polyvinyl chloride synthetic leather 100 contains at least a biomass material.

The polyvinyl chloride synthetic leather 100 of the embodiment of the present disclosure does not include any foaming structure, but can still provide a leather feeling as required by a conventional synthetic leather.

More specifically, the polyvinyl chloride synthetic leather 100 of the embodiment of the present disclosure sequentially (from bottom to top) includes a base fabric layer 1, a top fabric layer 2, and a surface treatment layer 3 that is optionally coated.

The top fabric layer 2 is directly formed on one surface of the base fabric layer 1, and the surface treatment layer 3 is formed on one surface of the top fabric layer 2 away from the base fabric layer 1. The polyvinyl chloride synthetic leather 100 of the embodiment of the present disclosure does not include any foaming structure.

In the present embodiment, the top fabric layer 2 has a solid structure (i.e., a main structure of the top fabric layer 2) that extends from the one surface of the top fabric layer 2 away from the base fabric layer 1 to the base fabric layer 1.

Furthermore, the solid structure of the top fabric layer 2 is directly in contact with the base fabric layer 1, and no foaming layer is disposed between the top fabric layer 2 and the base fabric layer 1. The solid structure of the top fabric layer 2 is not foamed, and does not have any foaming structures (e.g., foaming pores). In particular, the top fabric layer 2 of the embodiment of the present disclosure does not include any foaming structures, but can still provide the leather feeling as required by the conventional synthetic leather.

It should be noted that the solid structure mentioned in the present disclosure refers to a continuous resin structure that is not foamed by a foaming agent and does not have any foaming pores. However, during a process of manufacturing the synthetic leather, due to the compatibility between different polymer materials or added materials or due to process parameters, the solid structure may still have some pores, but the pores are not foaming pores formed through a foaming process.

Moreover, the leather feeling mentioned in the present disclosure refers to a tactile sensation that can be felt by a user when touching the polyvinyl chloride synthetic leather 100, and said tactile sensation is similar to that of a natural leather.

In order to achieve the technical purpose above, the solid structure of the top fabric layer 2 of the embodiment of the present disclosure is formed by a fabric composition.

The fabric composition mainly includes a polyvinyl chloride resin and a polymer plasticizer.

Based on a total weight, of the fabric composition being 100 parts by weight, a content of the polyvinyl chloride resin is 25 to 65 parts by weight, and is preferably 35 to 55 parts by weight. In addition, a content of the polymer plasticizer is 20 to 60 parts by weight, and is preferably 30 to 50 parts by weight.

Specifically, the polyvinyl chloride resin is a base material of the fabric composition, and the polyvinyl chloride resin is configured to provide a mechanical strength as required by the synthetic leather. The polymer plasticizer is a plasticizer having a high molecular weight, which not only improves an odor level of the synthetic leather but also allows the top fabric layer 2 to have the leather feeling.

The polyvinyl chloride resin of the embodiment of the present disclosure has a weight average molecular weight (Mw) within a range from 30,000 g/mol to 200,000 g/mol. The polyvinyl chloride resin of the embodiment of the present disclosure further has a glass transition temperature (Tg) within a range from 80° C. to 85° C.

The polymer plasticizer of the embodiment of the present disclosure has a special material property, so that the polyvinyl chloride synthetic leather 100 can have a low odor level and provide the leather feeling as required by the conventional synthetic leather in the absence of the foaming structure.

More specifically, the polymer plasticizer of the embodiment of the present disclosure has a first weight average molecular weight within a range from 1,500 g/mol to 6,000 g/mol, and preferably within a range from 2,000 g/mol to 5,000 g/mol, but the present disclosure is not limited thereto.

It is worth mentioning that the first weight average molecular weight of the polymer plasticizer of the embodiment of the present disclosure is much greater than that of a conventional plasticizer. A weight average molecular weight of the conventional plasticizer is substantially within a range from 300 g/mol to 800 g/mol.

Furthermore, the polymer plasticizer of the embodiment of the present disclosure has at least one soft segment in its molecular structure, and the at least one soft segment is in a linear shape and has an ether group.

In the polymer plasticizer, a concentration of the at least one soft segment having the ether group is within a range from 10 wt % to 50 wt %. The concentration of the at least one soft segment having the ether group is preferably within a range from 10 wt % to 40 wt %, and is more preferably within a range from 10 wt % to 30 wt %.

Based on the special design of the molecular weight and the molecular structure of the polymer plasticizer mentioned above, the polymer plasticizer can substitute for the conventional plasticizer having a low molecular weight, and use of the foaming agent is not required.

Accordingly, the odor level of the polyvinyl chloride synthetic leather 100 can be improved, and the molecular structure of the polymer plasticizer can allow the top fabric layer 2 of the polyvinyl chloride synthetic leather 100 to have the leather feeling.

More specifically, in the molecular structure of the polymer plasticizer, the at least one soft segment that has the ether group and is in the linear shape can soften a resin material within the above-mentioned concentration range, so as to provide the leather feeling.

Since the top fabric layer 2 of the embodiment of the present disclosure can provide the leather feeling in the absence of the foaming structure, the polyvinyl chloride synthetic leather 100 does not need to undergo a chemical foaming process that is performed at a high temperature.

In terms of thickness, the top fabric layer 2 has a thickness D within a range from 100 micrometers to 600 micrometers (preferably within a range from 150 micrometers to 350 micrometers), so as to provide sufficient leather feeling.

In one embodiment of the present disclosure, the at least one soft segment having the ether group is embedded at a center portion or an end portion of the molecular structure of the polymer plasticizer. In addition, the at least one soft segment having the ether group is located at a main chain of the polymer plasticizer, and is not present in the form of a side chain, but the present disclosure is not limited thereto.

The polymer plasticizer is a polyester polymer prepared by a polycondensation reaction between a dibasic acid raw material and a diol raw material, and the at least one soft segment having the ether group is formed of at least one of the dibasic acid raw material and the diol raw material.

The dibasic acid raw material is selected from the group consisting of adipic acid (AA), succinic acid (SA), maleic acid (MA), decanedioic acid, and dodecanedioic acid.

In addition, the diol raw material is selected from the group consisting of diethylene glycol (DEG), triethylene glycol (TEG), tetraethylene glycol, poly-tetra-hydrofuran (PTMEG), propane-1,2-diol (1,2-PG), 2-methyl-1,3-propanediol (MPO), neopentyl glycol (NPG), and [4-(hydroxymethyl) cyclohexyl]methanol (CHDM).

In some embodiments of the present disclosure, the dibasic acid raw material for synthesizing the polymer plasticizer can be adipic acid (AA). The diol raw material for synthesizing the polymer plasticizer can be diethylene glycol (DEG) and optionally include 2-methyl-1,3-propanediol (MPO) and/or poly-tetra-hydrofuran (PTMEG).

In the polycondensation reaction, the polymer plasticizer is further end-capped by an end-capped fatty acid to terminate the polycondensation reaction. The end-capped fatty acid is a monobasic fatty acid from a biomass source (e.g., a plant source), and a chemical structure of the end-capped fatty acid has only a single carboxyl group (—COOH group). That is, the end-capped fatty acid is a biomass derived fatty acid.

In some embodiments of the present disclosure, the chemical structure of the end-capped fatty acid has a long carbon chain having a carbon number ranging from C8 to C22, and preferably ranging from C12 to C18.

In addition, an end of the long carbon chain has a carboxyl group (—COOH group), and another end of the long carbon chain does not have any carboxyl group.

In some embodiments of the present disclosure, the end-capped fatty acid is selected from the group consisting of lauric acid, stearic acid, palmitic acid, linoleic acid, n-caprylic acid, capric acid, and myristic acid.

For example, a biomass-derived lauric acid can be derived from at least one of: coconut milk, coconut oil, laurel oil, and oil palm seed oil, and is preferably coconut milk, but the present disclosure is not limited thereto.

For example, a biomass-derived stearic acid can be derived from at least one of tea oil, cocoa butter, and palm oil, and is preferably tea oil, but the present disclosure is not limited thereto.

For example, a biomass-derived palmitic acid is derived from at least one of palm oil and palm kernel oil, and is preferably palm oil, but the present disclosure is not limited thereto.

For example, a biomass-derived linoleic acid is derived from at least one of safflower oil, sunflower seed oil, corn oil, and flax oil, and is preferably safflower oil, but the present disclosure is not limited thereto.

The chemical structure of the end-capped fatty acid from the biomass source is as follows.

| biomass-derived end-capped fatty acid | chemical structure |
| --- | --- |
| lauric acid | 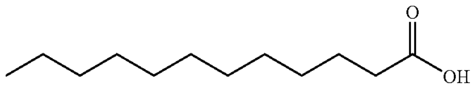 |
| stearic acid | 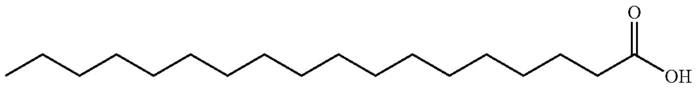 [SMILES: CCCCCCCCCCCCCCCCCC(=O)O] |
| palmitic acid | 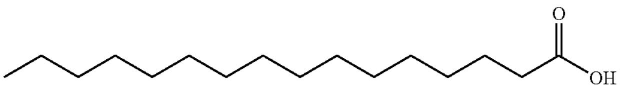 [SMILES: CCCCCCCCCCCCCCCC(=O)O] |
| linoleic acid | 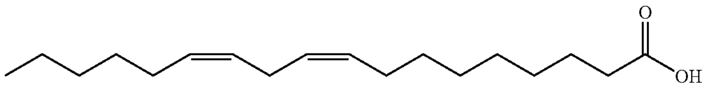 [SMILES: CCCCC/C=C\C/C=C\CCCCCCCC(=O)O] |

In the polycondensation reaction, relative to stoichiometry of an entire reaction, the dibasic acid raw material is a limiting reactant (otherwise referred to as a limiting reagent), and the diol raw material is an excess reactant (otherwise referred to as an excess reagent).

In other words, during a feeding process of the polycondensation reaction, a first initial molar amount of the dibasic acid raw material is less than a second initial molar amount of the diol raw material.

After the dibasic acid raw material and the diol raw material are polymerized through the polycondensation reaction to a number average molecular weight of between 500 g/mol and 2,000 g/mol (preferably between 800 g/mol and 1,500 g/mol), the dibasic acid raw material is reacted completely. The polyester polymer has excessive hydroxyl groups (—OH groups) at ends of its chemical structure. A reaction mixture of the polycondensation reaction contains a residue of the diol raw material.

In the present embodiment, during the polycondensation reaction, the excessive hydroxyl groups of the polyester polymer are end-capped by the end-capped fatty acid, so as to terminate the polycondensation reaction and finally form the polymer plasticizer. Furthermore, the end-capped fatty acid is also reacted with the residue of the diol raw material in the reaction mixture, thereby reducing a residual amount of the diol raw material in the polymer plasticizer to be less than 300 parts per million (ppm).

In addition, an acid value of the polymer plasticizer is controlled to be less than 1 mg KOH/g, thereby improving a rubber odor.

The acid value represents the number of milligrams of potassium hydroxide (KOH) required to neutralize 1 gram of a chemical. The acid value of the polymer plasticizer can be tested according to ASTM D664.

According to the above configuration, since the end of the chemical structure of the polymer plasticizer in the embodiment of the present disclosure is modified by a biomass-derived end-capped fatty acid, a biomass content of the polyvinyl chloride synthetic leather is increased.

Furthermore, since the biomass-derived end-capped fatty acid has a natural fragrance (i.e., a natural soap scent), the biomass-derived end-capped fatty acid can improve the odor emitted by the PVC synthetic leather.

Compared to removing diol merely through a conventional vacuum distillation technique, the technical solution provided by the embodiment of the present disclosure is more effective in the reduction of a diol residue in the reaction mixture.

Furthermore, since a viscosity of the polymer plasticizer is likely to be high, the polymer plasticizer cannot be easily mixed with the polyvinyl chloride resin, thereby causing difficulties in the manufacturing process.

In order to solve the above-mentioned technical issue, the fabric composition further includes a processing aid, which is less than or equal to 10 parts by weight based on the total weight of the fabric composition being 100 parts by weight. For example, the fabric composition can include 1, 2, 3, 4, 5, 6, 7, 8, 9, or 10 parts by weight of the processing aid, but the present disclosure is not limited thereto.

The processing aid is an aliphatic dibasic acid ester that is in a linear shape, and the processing aid has a second weight average molecular weight within a range from 300 g/mol to 800 g/mol. In other words, the weight average molecular weight of the processing aid is less than the weight average molecular weight of the polymer plasticizer.

In terms of the material type, the processing aid is selected from the group consisting of di-octyl sebacate (DOS), di-octyl adipate (DOA), di-isononyl adipate (DINA), di-isodecyl adipate (DIDA), and di-isononyl sebacate (DINS). In the present embodiment, the processing aid is preferably di-octyl sebacate (DOS).

According to the above configuration, the processing aid can assist in reducing the viscosity of the fabric composition, thereby enhancing the processability of the fabric composition.

In addition, the processing aid can also be used as a plasticizer having a low molecular weight, and can enhance the leather feeling of the top fabric layer 2.

However, a content of the processing aid cannot be too high. If the content of the processing aid is too high (e.g., higher than 15 parts by weight), the top fabric layer 2 may not be able to provide the required leather feeling or the required odor level.

In one embodiment of the present disclosure, the fabric composition further includes a stabilizer, and a content of the stabilizer is 3 parts by weight to 5 parts by weight based on the total weight of the fabric composition being 100 parts by weight. The stabilizer is configured to provide the thermal stability of a rubber and reduce the odor level of the synthetic leather.

The stabilizer is selected from the group consisting of lithium stearate, magnesium stearate, calcium stearate, barium stearate, zinc stearate, magnesium laurate, barium laurate, zinc laurate, calcium ricinoleate, barium ricinoleate, zinc ricinoleate, and zinc octoate.

In some embodiments of the present disclosure, the stabilizer is at least one of calcium ricinoleate, barium ricinoleate, and zinc ricinoleate.

It is worth mentioning that, during the manufacturing process of introducing the polymer plasticizer of the present disclosure into the polyvinyl chloride synthetic leather, more acidic substances (e.g., the end-capped fatty acid) may remain in the rubber, which is not conducive to the processing of the synthetic leather.

In order to improve the above-mentioned technical problem, an amount of the stabilizer (e.g., calcium ricinoleate and/or zinc ricinoleate) in the fabric layer composition of the present disclosure is increased, such that the processability of the synthetic leather is enhanced.

For instance, in a specific embodiment of the present disclosure, calcium ricinoleate and zinc ricinoleate are used concurrently, and the polyvinyl chloride synthetic leather undergoes a heat stability test (i.e., testing the color change of the synthetic leather at 190° C.). The amount of the stabilizer is increased to 3 parts by weight, and the color of the polyvinyl chloride synthetic leather is not changed after being heated for 80 to 85 minutes. However, the present disclosure is not limited thereto.

In one embodiment of the present disclosure, the fabric composition further includes 0 to 10 parts by weight of fillers, and the fillers are inorganic granular materials.

The fillers are selected from the group consisting of: calcium carbonate, silicon dioxide, aluminium oxide, clay, talc, diatomaceous earth (metal oxides), ferrite, glass, carbon black, metal fibers, metal powders, glass ball, graphite, aluminum hydroxide, barium sulfate, magnesium oxide, magnesium carbonate, magnesium silicate, and calcium silicate. Preferably, the fillers are calcium carbonate, but the present disclosure is not limited thereto.

In one embodiment of the present disclosure, the fabric composition further includes 2 parts by weight to 8 parts by weight of a flame retardant.

The flame retardant is selected from the group consisting of: aluminum hydroxide, magnesium hydroxide, antimony trioxide, zinc borate, cresyl diphenyl phosphate, tris(2-chloroethyl) phosphate, tris(1-chloropropan-2-yl) phosphate, phosphoric acid tris(2-chloro-1-methylethyl) ester, and chlorinated paraffin wax. Preferably, the flame retardant is antimony trioxide, but the present disclosure is not limited thereto.

It is worth mentioning that in one embodiment of the present disclosure, the fabric composition does not include any foaming agent (e.g., a chemical foaming agent or a physical foaming agent). The top fabric layer 2 can provide the leather feeling as required by the conventional synthetic leather in the absence of the foaming structure or without using the foaming agent. That is, a pungent odor caused by the foaming structure or use of the foaming agent can be avoided in the present disclosure.

Referring to FIG. 2, the base fabric layer 1 can be, for example, a woven fabric or a non-woven fabric. In addition, the top fabric layer 2 can be synthesized onto the base fabric layer 1, so as to form into a synthetic leather with an appearance similar to that of the natural leather.

In the present embodiment, the polyvinyl chloride synthetic leather 100 further includes the surface treatment layer 3. The surface treatment layer 3 is formed by a water-based surface treatment agent that is coated onto the surface of the top fabric layer 2 away from the base fabric layer 1. The surface treatment layer 3 can improve properties of the polyvinyl chloride synthetic leather 100, such as gloss, tactile sensation, light resistance, heat resistance, dirt resistance, abrasion resistance, and scratch resistance.

One surface of the surface treatment layer 3 away from the top fabric layer 2 can be embossed at a high temperature, so as to form different patterns on the surface of the synthetic leather. In the present embodiment, the water-based surface treatment agent is a water-based polyurethane treatment agent without N-ethylpyrrolidone. Accordingly, a material composition of the surface treatment layer 3 enables the polyvinyl chloride synthetic leather 100 to have a lower odor level, thereby enhancing pleasantness of the user when in use.

Instead of a conventional solvent-based treatment agent, the water-based surface treatment agent adopts the water-based polyurethane treatment agent without N-ethylpyrrolidone. Accordingly, a solvent material (e.g., toluene or xylene) that has a pungent odor and is harmful to the human body can be avoided. In addition, by using the water-based polyurethane treatment agent of the present embodiment, N-ethylpyrrolidone is not used, and the pungent odor can be reduced.

It is worth mentioning that in the present embodiment, no foaming layer or foaming structure is disposed between the surface treatment layer 3 and the top fabric layer 2, and the surface treatment layer 3 does not include any foaming pores, but the present disclosure is not limited thereto.

According to the above configuration, the polyvinyl chloride synthetic leather 100 without the foaming structure provided in the present disclosure is applicable in an automotive interior, such as a car door panel, a dashboard, a control panel, an upright column, a seat rear panel, and a seat fabric.

Naturally, the polyvinyl chloride synthetic leather 100 without the foaming structure provided in the present disclosure can also be applicable in other fields similar to that for automotive interiors. [Method for Producing Polyvinyl Chloride Synthetic Leather]

The descriptions above illustrate the material characteristics of the polyvinyl chloride synthetic leather in the embodiment of the present disclosure. A method for producing a polyvinyl chloride synthetic leather, which includes steps S110, S120, and S130, will be illustrated below. It should be noted that the sequence of each step and actual implementations described in the present embodiment can be adjusted according to practical requirements, and the present disclosure is not limited thereto.

Step S110 includes: providing a base fabric layer 1. The base fabric layer 1 can be, for example, a woven fabric or a non-woven fabric.

Step S120 includes: forming a top fabric layer 2 on a side surface of the base fabric layer 1.

The top fabric layer 2 is formed of a fabric composition. The fabric composition includes a polyvinyl chloride resin and a polymer plasticizer.

Based on a total weight of the fabric composition being 100 parts by weight, an amount of the polyvinyl chloride resin is between 25 parts by weight and 65 parts by weight (preferably between 35 parts by weight and 55 parts by weight), and an amount of the polymer plasticizer is between 20 parts by weight and 60 parts by weight (preferably between 30 parts by weight and 50 parts by weight).

The polymer plasticizer has a first weight average molecular weight between 1,500 g/mol and 6,000 g/mol, and preferably between 2,000 g/mol and 5,000 g/mol, but the present disclosure is not limited thereto. Furthermore, the polymer plasticizer is a polyester polymer formed by a polycondensation reaction of a dibasic acid raw material and a diol raw material. The material types of the dibasic acid raw material and the diol raw material have been described above, and will not be reiterated herein.

In the polycondensation reaction, the polymer plasticizer is further end-capped by an end-capped fatty acid to terminate the polycondensation reaction. The end-capped fatty acid is a monobasic fatty acid from a biomass source (e.g., a plant source), and a chemical structure of the end-capped fatty acid has only a single carboxyl group (—COOH group). That is, the end-capped fatty acid is a biomass derived fatty acid.

In some embodiments of the present disclosure, the chemical structure of the end-capped fatty acid has a long carbon chain having a carbon number ranging from C8 to C22, and preferably ranging from C12 to C18. In addition, an end of the long carbon chain has a carboxyl group (—COOH group), and another end of the long carbon chain does not have any carboxyl group.

In some embodiments of the present disclosure, the end-capped fatty acid is selected from the group consisting of lauric acid, stearic acid, palmitic acid, linoleic acid, n-caprylic acid, capric acid, and myristic acid.

In the polycondensation reaction, relative to stoichiometry of an entire reaction, the dibasic acid raw material is a limiting reactant (otherwise referred to as a limiting reagent), and the diol raw material is an excess reactant (otherwise referred to as an excess reagent). In other words, during a feeding process of the polycondensation reaction, a first initial molar amount of the dibasic acid raw material is less than a second initial molar amount of the diol raw material.

After the dibasic acid raw material and the diol raw material are polymerized through the polycondensation reaction to a number average molecular weight of between 500 g/mol and 2,000 g/mol (preferably between 800 g/mol and 1,500 g/mol), the dibasic acid raw material is reacted completely. The polyester polymer has excessive hydroxyl groups (—OH groups) at ends of its chemical structure. A reaction mixture of the polycondensation reaction contains a residue of the diol raw material.

In the present embodiment, during the polycondensation reaction, the excessive hydroxyl groups of the polyester polymer are end-capped by the end-capped fatty acid, so as to terminate the polycondensation reaction and finally form the polymer plasticizer. Furthermore, the end-capped fatty acid is also reacted with the residue of the diol raw material in the reaction mixture, thereby reducing a residual amount of the diol raw material in the polymer plasticizer to be less than 300 parts per million (ppm).

In addition, an acid value of the polymer plasticizer is controlled to be less than 1 mg KOH/g, thereby improving a rubber odor.

The acid value represents the number of milligrams of potassium hydroxide (KOH) required to neutralize 1 gram of a chemical. The acid value of the polymer plasticizer can be tested according to ASTM D664.

According to the above configuration, since the end of the chemical structure of the polymer plasticizer of the embodiment of the present disclosure is modified by a biomass-derived end-capped fatty acid, a biomass content of the polyvinyl chloride synthetic leather is increased.

Furthermore, since the biomass-derived end-capped fatty acid has a natural fragrance (i.e., a natural soap scent), the biomass-derived end-capped fatty acid can improve the odor emitted by the PVC synthetic leather.

Compared to removing diol merely through a conventional vacuum distillation technique, the technical solution provided by the embodiment of the present disclosure is more effective in the reduction of a diol residue in the reaction mixture.

Furthermore, the polymer plasticizer can be formed by, for example, a plasticizer preparation method that includes: an esterification step, an end-capping step, and a pressure reduction step.

The esterification step includes mixing the dibasic acid raw material (e.g., AA) with the diol raw material (e.g., MPO, DEG, PTMEG), so as to form a reaction mixture (i.e., a reaction liquid).

Subsequently, the reaction mixture is heated to a first temperature (e.g., 110° C. to 150° C., and preferably 120° C. to 140° C.), and is maintained at the first temperature for 0.5 hours to 2 hours, so as to carry out a polycondensation reaction.

Then, the reaction mixture is heated to a second temperature (e.g., 190° C. to 200° C., and preferably 195° C.), and is maintained at the second temperature for 2 hours to 4 hours. In this process, the dibasic acid raw material and the diol raw material are polymerized through the polycondensation reaction to a number average molecular weight of between 500 g/mol and 2,000 g/mol (preferably between 800 g/mol and 1,500 g/mol), thereby forming a high-molecular-weight polyester polyol.

As mentioned above, in the polycondensation reaction, relative to stoichiometry of an entire reaction, the dibasic acid raw material is a limiting reactant, and the diol raw material is an excess reactant.

In other words, during a feeding process of the polycondensation reaction, a first initial molar amount of the dibasic acid raw material is less than a second initial molar amount of the diol raw material.

The end-capping step includes adding the biomass derived fatty acid (e.g., lauric acid) into the reaction mixture to end-cap the high-molecular-weight polyester polyol formed in the above-mentioned esterification step, thereby terminating the polycondensation reaction. Accordingly, the polymer plasticizer of the embodiment of the present disclosure is formed in the reaction mixture. In the end-capping step, the reaction mixture is heated to a third temperature (e.g., 200° C. to 210° C., and preferably 205° C.), and is maintained at the third temperature for 2 hours to 4 hours, so as to continuously distill out water and increase a concentration of the polymer plasticizer in the reaction mixture.

It is worth mentioning that during the end-capping step, a third initial molar amount of the end-capped fatty acid added in the reaction mixture is greater than a difference value obtained by subtracting the first initial molar amount of the dibasic acid raw material from the second initial molar amount of the diol raw material, and the third initial molar amount is 1.5 to 3 times the difference value.

Accordingly, the end-capped fatty acid can effectively end-cap excessive hydroxyl groups on the high-molecular-weight polyester polyol to terminate the polycondensation reaction. The end-capped fatty acid can also be reacted with the residue of the diol raw material in the reaction mixture, thereby reducing the residual amount of the diol raw material in the reaction mixture and avoiding excessive end-capped fatty acid:

In some embodiments of the present disclosure, a molar ratio among the first initial molar amount of the dibasic acid raw material, the second initial molar amount of the diol raw material, and the third initial molar amount of the end-capped fatty acid is 0.27 to 0.31:0.32 to 0.35:0.06 to 0.09, and is preferably 0.28 to 0.30:0.32 to 0.34:0.07 to 0.09. Specifically, the molar ratio can be 0.29:0.33:0.08, but the present disclosure is not limited thereto.

The pressure reduction step includes reducing a pressure of the reaction mixture that contains the polymer plasticizer formed in the end-capping step from a normal pressure (e.g., 760 torr) to a low pressure (e.g., 50 to 150 torr). In addition, the reaction mixture is lowered to a fourth temperature (e.g., 190° C. to 200° C., and preferably 195° C.), and is maintained at the fourth temperature for 1 hour to 3 hours. In the pressure reduction step, the acid value of the polymer plasticizer is adjusted to be less than 1 mg KOH/g, so as to reach a reaction end point and complete the preparation of the polymer plasticizer.

According to the above configuration, since the end of the chemical structure of the polymer plasticizer in the embodiment of the present disclosure is modified by the biomass-derived end-capped fatty acid, the biomass content of the polyvinyl chloride synthetic leather is increased, and the biomass-derived end-capped fatty acid can improve the odor emitted by the PVC synthetic leather.

Step S130 includes: forming a surface treatment layer 3 on a side surface of the top fabric layer 2 away from the base fabric layer 1. The surface treatment layer 3 is formed on the surface of the top fabric layer 2 by coating a water-based surface treatment agent to complete the polyvinyl chloride synthetic leather. In the present embodiment, the water-based surface treatment agent is a water-based polyurethane treatment agent that does not contain N-ethylpyrrolidone.

Experimental Data and Test Results

Hereinafter, the contents of the present disclosure will be described in detail with reference to Exemplary Examples 1 to 3 and Comparative Example 1. However, the following examples are only used to help in understanding of the present disclosure, but the present disclosure is not limited to these examples.

Exemplary Example 1 is described as follows.

A fabric composition of Exemplary Example 1 shown in Table 1 below is mixed and melted at a high temperature through a small mixer and a high-power mixer (otherwise referred to as a Banbury mixer) in sequence. Then, the fabric composition is calendered through a calender, so that the fabric composition is formed into a top fabric layer, and the top fabric layer is bonded to a base fabric layer through the calender. A water-based polyurethane treatment agent is further coated on a surface of the top fabric layer and dried to form a surface treatment layer. Accordingly, a polyvinyl chloride synthetic leather is formed. The polyvinyl chloride synthetic leather of Exemplary Example 1 is tested for physical and chemical properties. The test results are as shown in Table 1. A polymer plasticizer is made by mixing a dibasic acid raw material (i.e., AA) and a diol raw material (i.e., MPO, DEG, PTMEG in a molar ratio of 2:1:0.05) to form a reaction mixture (i.e., a reaction liquid). The reaction mixture is heated to 130° C. and maintained at 130° C. for 1 hour, and is then heated to 195° C. and maintained at 195° C. for 3 hours, so as to carry out a polycondensation reaction (i.e., an esterification reaction) for formation of a polyester polyol. Afterwards, a biomass-derived end-capped fatty acid (i.e., lauric acid) is added into the reaction mixture to perform an end-capping reaction on the polyester polyol. The temperature of the reaction mixture is further heated to 205° C. and maintained at 205° C. for 3 hours to distill off water, such that the polymer plasticizer is formed in the reaction mixture. The polymer plasticizer has a weight average molecular weight of 3,845 g/mol.

In Exemplary Example 1, a molar ratio of the dibasic acid raw material, the diol raw material, and the end-capped fatty acid is 0.29:0.33:0.08.

Finally, the reaction mixture containing the polymer plasticizer is put into a decompression section from 760 torr to 100 torr, and the temperature of the reaction mixture is controlled at 195° C. for 2 hours. An acid value of the polymer plasticizer is adjusted to be less than 1 mg KOH/g, so as to reach an end point of the reaction and complete the preparation of the polymer plasticizer.

Exemplary Examples 2 and 3 are prepared in a manner substantially the same as that of Exemplary Example 1. The differences between Exemplary Examples 2 and 3 and Exemplary Example 1 lie in the formula of the fabric composition and the material selection of the end-capped fatty acid for synthesizing the polymer plasticizer.

In addition, the end-capped material of the polymer plasticizer of Comparative Example 1 is isooctyl alcohol (monohydric alcohol), which is not an end-capped fatty acid (i.e., a monohydric fatty acid).

The polyvinyl chloride synthetic leathers prepared in Exemplary Examples 1 to 3 and Comparative Example 1 are tested to obtain the physical and chemical properties, such as odor levels, residual amounts of low-boiling alcohols (ppm), and odor types. The relevant test results are summarized in Table 1.

The odor level is tested according to Volkswagen odor test standard PV3900C3, the temperature condition is set at 80° C., and the test time is 2 hours. The odor rating system is divided into 6 levels, in which 1 represents no odor, 2 represents faint odor but non-interfering, 3 represents noticeable odor but non-interfering, 4 represents interfering odor, 5 represents strongly-interfering odor, and 6 represents unbearable odor.

The residual amount of the low-boiling alcohols (ppm) is tested by using a headspace method. In this method, one gram of the product is placed in a test vial and heated at 120° C. for 30 minutes. The gas at the top of the vial is then extracted with a syringe for analytical quantification.

TABLE 1

[Experimental Conditions and Test Results]

| Items | Exemplary Example 1 | Exemplary Example 2 | Exemplary Example 3 | Comparative Example 1 |
|---|---|---|---|---|
| Top fabric layer | | | | |
| Amount of polyvinyl chloride resin (parts by weight) | 45 | 45 | 45 | 45 |
| Amount of polymer plasticizer (parts by weight) | 40 | 40 | 40 | 40 |
| Mw of polymer plasticizer (g/mol) | 3,845 | 3,825 | 3,650 | 3,359 |
| Material types of dibasic acid | AA | AA | AA | AA |
| Material types of dihydric alcohol (dio) | MPO, DEG, PTMEG (molar ratio = 2:1:0.05) | MPO, DEG, PTMEG (molar ratio = 2:1:0.05) | MPO, DEG, PTMEG (molar ratio = 2:1:0.05) | MPO, DEG, PTMEG (molar ratio = 2:1:0.05) |
| Material types of end-capped agent | lauric acid | palmitic acid | stearic acid | iso-octanol |
| Molar ratio of dibasic acid:dihydric alcohol (dio):end-capped agent | 0.29:0.33:0.08 | 0.29:0.33:0.08 | 0.29:0.33:0.08 | 0.33:0.29:0.09 |
| Amount of processing aids (parts by weight) | 5 | 5 | 5 | 5 |
| Material types of processing aids | DOS | DOS | DOS | DOS |
| Amount of stabilizer (parts by weight) | 3 | 3 | 3 | 1 |
| Material types of stabilizer | calcium ricinoleate zinc ricinoleate (weight ratio 1:1) | calcium ricinoleate zinc ricinoleate (weight ratio 1:1) | calcium ricinoleate zinc ricinoleate (weight ratio 1:1) | calcium ricinoleate zinc ricinoleate (weight ratio 1:1) |

TABLE 1-continued

[Experimental Conditions and Test Results]

| Items | Exemplary Example 1 | Exemplary Example 2 | Exemplary Example 3 | Comparative Example 1 |
|---|---|---|---|---|
| Amount of fillers (parts by weight) | 5.5 | 5.5 | 5.5 | 5.5 |
| Material types of fillers | calcium carbonate | calcium carbonate | calcium carbonate | calcium carbonate |
| Amount of flame retardant (parts by weight) | 3.5 | 3.5 | 3.5 | 3.5 |
| Material types of flame retardant | antimony trioxide | antimony trioxide | antimony trioxide | antimony trioxide |
| Thickness of top fabric layer (micrometer) | 250 | 250 | 250 | 250 |
| Test results | | | | |
| odor level (levels 1 to 6) | 3.0 | 3.0 | 3.0 | 3.5 |
| residual amount of low-boiling alcohols (ppm) | 155 | 180 | 164 | 2,242 |
| odor types (natural scent/chemical smell) | natural soap scent | natural scent | natural oil scent | chemical smell |

It can be seen from the experimental results in Table 1 that the odor levels of Exemplary Examples 1 to 3 are all 3, which are smaller than 3.5 of Comparative Example 1. The residual amounts of the low-boiling alcohols in Exemplary Examples 1 to 3 are all less than 300 ppm, which are less than 2,242 ppm in Comparative Example 1. The odor types of Exemplary Examples 1 to 3 are all natural scents, which are different from the chemical smell of Comparative Example 1. Furthermore, in the experimental results not recorded in Table 1, the amount of the stabilizer in each of Exemplary Examples 1 to 3 is increased to 3 parts by weight. Accordingly, the finally-formed polyvinyl chloride synthetic leathers can be heated for 80 to 85 minutes without color change.

Beneficial Effects of the Embodiments

In conclusion, in the polyvinyl chloride synthetic leather and the method for producing the same provided by the present disclosure, by virtue of the polymer plasticizer's molecular weight and structural design, the conventional low-molecular-weight plasticizers can be replaced, and the use of foaming agents can be avoided. As a result, not only is the odor rating of the synthetic leather improved, but the molecular structure of the polymer plasticizer also enables the top fabric layer of the synthetic leather to have a leather-like touch feeling.

Furthermore, as the chemical structure of the polymer plasticizer used in the present disclosure is end-capped with the biomass-derived end-capped fatty acid, the polymer plasticizer increases the biomass content in the polyvinyl chloride synthetic leather.

Additionally, the biomass-derived end-capped fatty acid possesses a natural fragrance (e.g., a natural soap scent), which aids in enhancing the emitted odor from the polyvinyl chloride synthetic leather.

Moreover, in terms of reducing the diol residue in the reaction mixture, the technical solution provided by the present disclosure is more effective in the reduction of the diol residue as compared to removing the diol merely through the conventional vacuum distillation technique.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyvinyl chloride synthetic leather without a foaming structure, comprising:

a base fabric layer; and a top fabric layer formed on the base fabric layer; wherein the top fabric layer is formed of a fabric composition, and based on a total weight of the fabric composition being 100 parts by weight, the fabric composition contains: 25 parts by weight to 65 parts by weight of a polyvinyl chloride resin and 20 parts by weight to 60 parts by weight of a polymer plasticizer;

wherein the polymer plasticizer is formed by a polycondensation reaction of a dibasic acid raw material and a diol raw material, and is end-capped by an end-capped fatty acid; wherein the end-capped fatty acid is a biomass-derived fatty acid, a chemical structure of the end-capped fatty acid has a long carbon chain having a carbon number ranging from C8 to C22, an end of the long carbon chain has a carboxyl group, and another end of the long carbon chain does not have any carboxyl group;

wherein a molar ratio among a first initial molar amount of the dibasic acid raw material, a second initial molar amount of the diol raw material, and a third initial molar amount of the end-capped fatty acid ranges from 0.28 to 0.30:0.32 to 0.34:0.07 to 0.09, and a weight average molecular weight of the polymer plasticizer ranges from 3,650 to 3,845 g/mol;

wherein the diol raw material consists of 2-methyl-1,3-propanediol (MPO), diethylene glycol (DEG) and poly-tetra-hydrofuran (PTMEG), and has molar ratio of 2:1:005;

wherein a residual amount of the diol raw material in the polymer plasticizer ranges from 155 parts per million to 180 parts per million, and an acid value of the polymer plasticizer is less than 1 mg KOH/g.

2. The polyvinyl chloride synthetic leather according to claim 1, wherein the end-capped fatty acid is selected from the group consisting of lauric acid, stearic acid, palmitic acid, linoleic acid, n-caprylic acid, capric acid, and myristic acid.

3. The polyvinyl chloride synthetic leather according to claim 1, wherein the fabric composition further includes 3 parts by weight to 5 parts by weight of a stabilizer; wherein the stabilizer is selected from the group consisting of lithium stearate, magnesium stearate, calcium stearate, barium stearate, zinc stearate, magnesium laurate, barium laurate, zinc laurate, calcium ricinoleate, barium ricinoleate, zinc ricinoleate, and zinc caprylate.

4. The polyvinyl chloride synthetic leather according to claim 1, wherein no foaming layer is disposed between the top fabric layer and the base fabric layer, and the top fabric layer does not have foaming pores.

5. A method for producing a polyvinyl chloride synthetic leather without a foaming structure, comprising processes of:

providing a base fabric layer; and forming a top fabric layer on a side surface of the base fabric layer, wherein the top fabric layer is formed of a fabric composition;

wherein, based on a total weight of the fabric composition being 100 parts by weight, the fabric composition contains: 25 parts by weight to 65 parts by weight of a polyvinyl chloride resin and 20 parts by weight to 60 parts by weight of a polymer plasticizer;

wherein the polymer plasticizer is formed by a polycondensation reaction of a dibasic acid raw material and a diol raw material, and is end-capped by an end-capped fatty acid;

wherein the end-capped fatty acid is a biomass derived fatty acid, a chemical structure of the end-capped fatty acid has a long carbon chain having a carbon number ranging from C8 to C22, an end of the long carbon chain has a carboxyl group, and another end of the long carbon chain does not have any carboxyl group;

wherein a molar ratio among a first initial molar amount of the dibasic acid raw material, a second initial molar amount of the diol raw material, and a third initial molar amount of the end-capped fatty acid ranges from 0.28 to 0.30:0.32 to 0.34:0.07 to 0.09, and a weight average molecular weight of the polymer plasticizer ranges from 3,650 to 3,845 g/mol;

where the diol raw material consists of 2-methyl-1,3-propanediol (MPO), diethylene glycol (DEG) and poly-tetra-hydrofuran (PTMEG), and has a molar ratio of 2:1:0.05;

wherein a residual amount of the diol raw material in the polymer plasticizer ranges from 155 parts per million to 180 parts per million, and an acid value of the polymer plasticizer is less than 1 mg KOH/g.

6. The method according to claim 5, wherein the polymer plasticizer is formed by:

performing an esterification process that includes: mixing the dibasic acid raw material with the diol raw material to form a reaction mixture, and heating the reaction mixture to carry out the polycondensation reaction, so as to form a high-molecular-weight polyester polyol; wherein ends of a chemical structure of the high-molecular-weight polyester polyol have excessive hydroxyl groups (—OH); and performing an end-capping process that includes: adding the biomass derived fatty acid into the reaction mixture to end-cap the excessive hydroxyl groups on the high molecular weight polyester polyol, so as to terminate the polycondensation reaction and form the polymer plasticizer.

7. The method according to claim 6, wherein the molar ratio among the first initial molar amount of the dibasic acid raw material, the second initial molar amount of the diol raw material, and the third initial molar amount of the end-capped fatty acid is 0.29:0.33:0.8.

* * * * *